March 6, 1928.
P. RAIMER
1,661,737
TRACTOR TRAILER CONNECTION
Filed Aug. 17, 1925
3 Sheets-Sheet 1
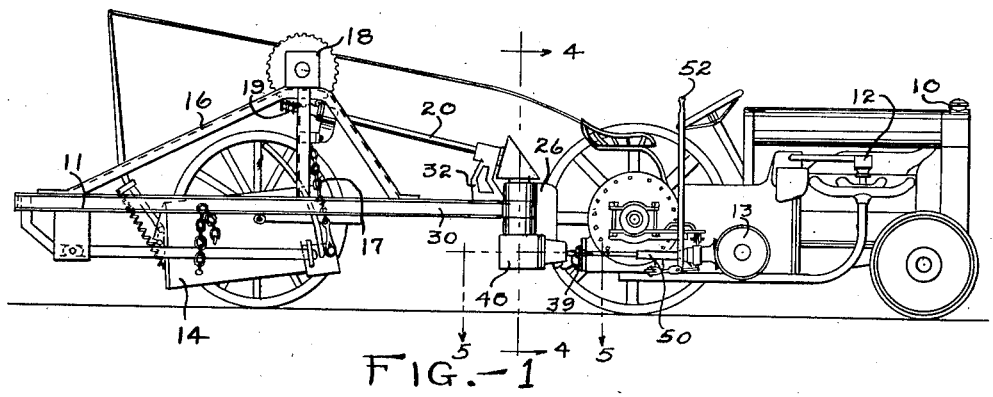
FIG.-1
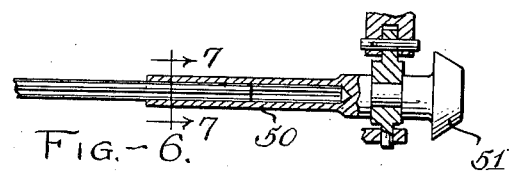
FIG.-6.
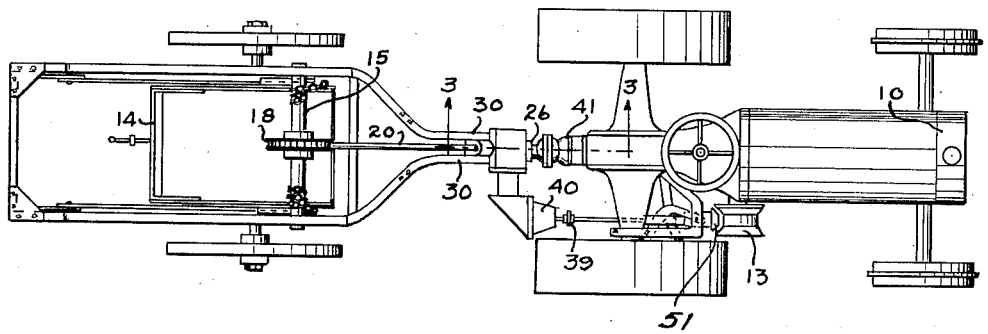
FIG.-2
FIG.-7
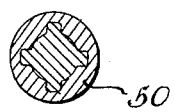
Inventor
Philip Raimer
By Bates, Macklin, Zobrick & Teare
Attorneys

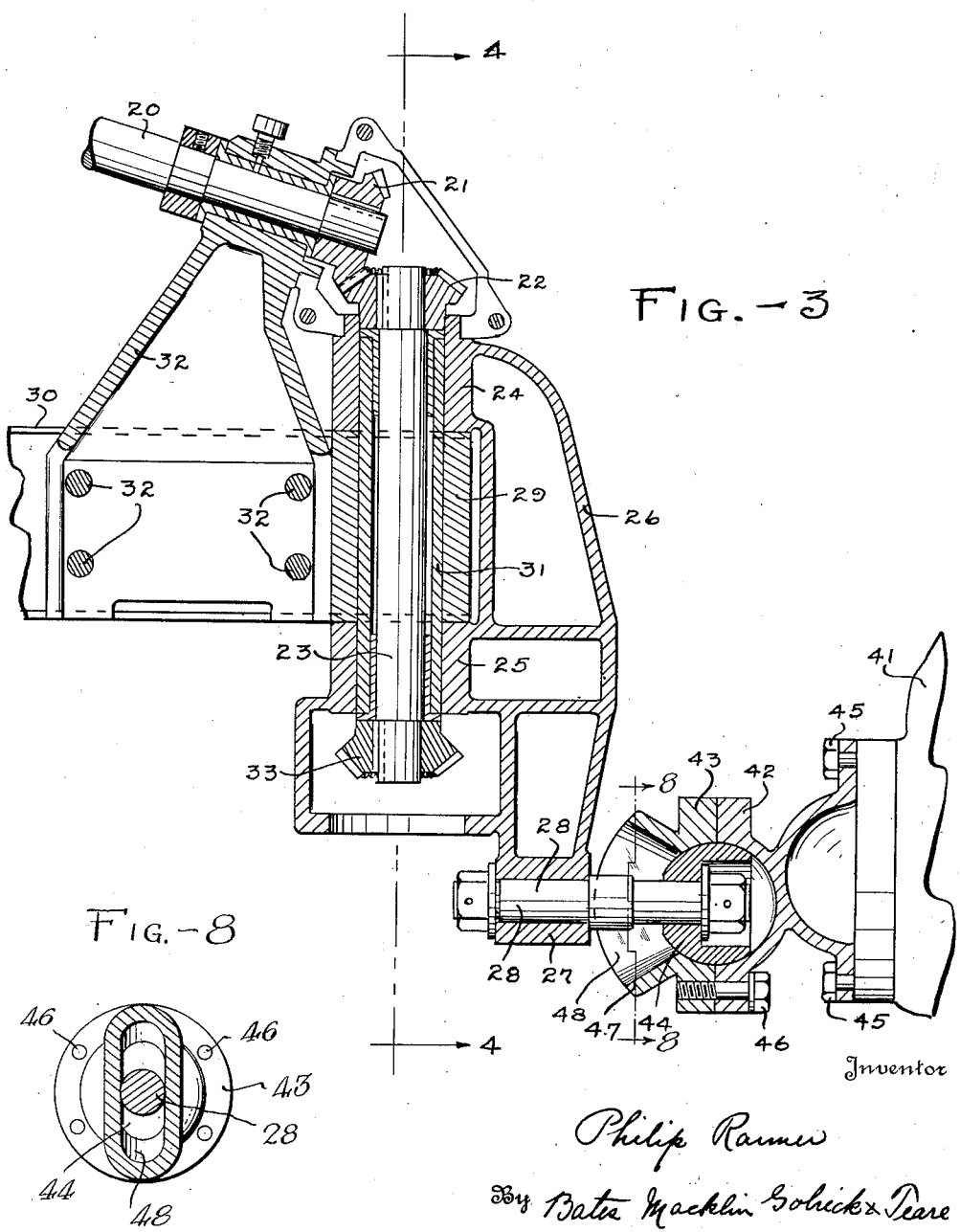

March 6, 1928.  
P. RAIMER  
TRACTOR TRAILER CONNECTION  
Filed Aug. 17, 1925

1,661,737

3 Sheets-Sheet 3

Inventor  
Philip Raimer  
By Bates, Macklin, Tolrick & Teare  
Attorneys

Patented Mar. 6, 1928.

1,661,737

UNITED STATES PATENT OFFICE.

PHILIP RAIMER, OF MAPLE HEIGHTS, OHIO.

TRACTOR TRAILER CONNECTION.

Application filed August 17, 1925. Serial No. 50,650.

Considerable difficulty has heretofore been experienced in providing a satisfactory connection between a tractor and trailer, particularly where operating mechanism is mounted on the trailer, while controlling mechanism is mounted on the tractor, and a transmission mechanism connects the operating with the controlling mechanism. One reason for the difficulty is the severe load stresses which occur if the trailer comprises an excavating machine and if the excavating tool strikes a root or boulder beneath the ground. The difficulty of maintaining an operative connection has been so great, that in some instances, it has been necessary to place concrete or other heavy material adjacent the front end of the tractor to hold the tractor upon the ground.

The principal object of my invention is to make a connection between the tractor and trailer which obviates the necessity for using heavy material to hold down the front end of the tractor in case the trailer comprises an excavating machine and is subjected to undue working stresses. In this connection, my invention contemplates the provision of a connection which will allow the trailer to turn in a horizontal plane, to swing in a vertical plane, and to twist with reference to the tractor without interfering with the operation of the transmission mechanism between the tractor and trailer. Moreover, my invention is directed toward the provision of the transmission mechanism between the tractor and trailer. Moreover, my invention is directed toward the provision of a tractor and trailer connection which is quite simple in construction and which may be attached to existing tractors.

Figure 4:
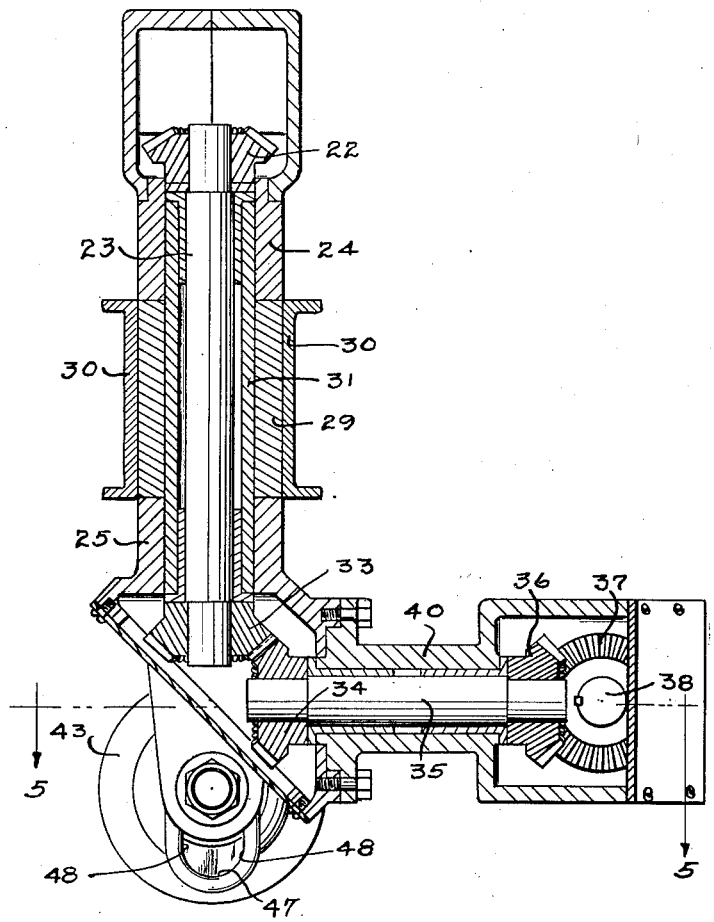
Figure 5:
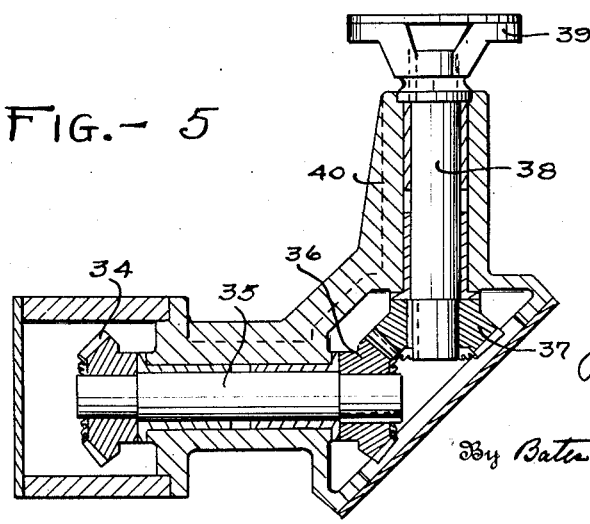

The means for carrying out my invention is illustrated in the preferred form in the drawings, wherein Fig. 1 is a side elevation of a tractor and trailer having a connection therebetween made in accordance with my invention; Fig. 2 is a plan view of the tractor and trailer shown in Fig. 1; Fig. 3 is a section on an enlarged scale taken on a plane indicated by the line 3—3 in Fig. 2; Fig. 4 is a section taken through the connecting mechanism on a plane indicated by the line 4—4 in Fig. 3; Fig. 5 is a section taken on a plane indicated by the line 5—5 in Fig. 4; Fig. 6 is a section on an enlarged scale showing a slip joint connection used with my invention; Fig. 7 is a section taken on a plane indicated by the line 7—7 in Fig. 6, and Fig. 8 is a section taken on a plane indicated on the line 8—8 in Fig. 3.

I have illustrated my invention in connection with a tractor 10 and a trailer 11. The motor on a tractor shown in general at 12 has a power take-off device shown in the form of a pulley wheel 13 which is usually provided in some forms of tractors.

The trailer which I have shown comprises an excavating machine in the form of a two-wheeled scraper having a pan 14, the nose of which may be raised or lowered by the tractor operator. One form of mechanism for raising and lowering the pan is illustrated herein as embodying a winding drum 15 which is journaled in a frame 16 and which is operatively connected to the pan by chains 17. To rotate the drum, I have shown a worm wheel 18 which is actuated by a worm 19 on a shaft 20. The shaft at the forward end carries a pinion 21 which meshes with a pinion 22 on a vertical shaft 23. The shaft 23 comprises a vertical pivot about which the trailer may turn with reference to the tractor and is journaled between arms 24 and 25 of a bracket 26. This bracket supports, as at 27, one member 28 of a compound pivotal connection to provide an operable connection with the tractor.

To connect the bracket 26 with the trailer, I have shown a block 29 which is carried between arms 30 of the trailer frame, and which has an opening through which a sleeve 31 may extend. The sleeve in turn extends into the arms 24 and 25 of the bracket and provides a suitable bearing for the shaft 23. The block 29 may form part of a standard 32 which functions to journal the forward end of the shaft 20. Suitable securing members 32 may hold the standard and block in adjusted position with reference to the trailer frame.

To rotate the shaft, I have shown a pinion 33 which meshes with a pinion 34 on a horizontal lay shaft 35. The shaft 35 as shown, carries a pinion 36 which meshes with the pinion 37 on a driving shaft 38. The driving shaft may be connected through a flexible coupling 39 and through a slip joint 50 to a driving wheel 51. The driving wheel may be connected by engagement with the pulley wheel 13 in any suitable manner.

As a result of the mechanism heretofore described, the tractor operator may actuate a lever 52 to effect a direct connection between the motor on the tractor and the winding drum on the trailer. In this way, the nose of the pan may be raised or lowered at will by the operator while the tractor is moving in a forward direction. During such forward movement, the trailer may swing or turn in a horizontal plane with reference to the tractor about the axis of the shaft 23. By making the trailer turn about the axis of the shaft 23 I can turn the tractor and trailer in a shortest possible turn without danger of disconnecting the slip joint 50.

To permit vertical movement of the tractor with reference to the trailer, I have shown the bracket 26 as having a compound pivotal connection with the tractor including one member 28 which is mounted in a substantially horizontal position and another member 44 which is mounted for rotation within sockets formed in the cooperating members 42 and 43. The member 42 is shown as being attached to the housing 41 by securing members 45, while other securing members 46 may be used for connecting the two socket members. The pivot member 28 is shown as being attached at one end to the socket member 44, and at the other end to the bracket 26.

The member 28 is allowed to move only in a vertical plane by reason of the fact that the socket member 43 has a flared recess 47, the walls 48 of which act as a guide and prevent the member from turning in a horizontal plane with reference to the tractor. Thus, the trailer cannot swing in a horizontal plane about the axis of the pivot 28, but on the other hand, the trailer may move vertically about the center of the ball member and may twist about the axis of the pivot 28. This is especially advantageous in that excavating machines are usually operated over uneven ground which results in considerable rocking of the trailer during the excavating operation. By making the socket member 43 of a comparatively heavy casting, the walls 48 can bear against the shaft 28 and thereby restrain the bracket 26 from turning during the turning movement of the trailer.

By employing a compound pivotal connection in the manner illustrated, I have been able to operate the trailer for excavating purposes without requiring the front wheels of the tractor to be weighted down with concrete or other material as has been required with other forms of tractor and trailer connections. This effects a material saving in tractor equipment and renders the machine safer to use, particularly in locations where objects such as roots or boulders are encountered by the excavating pan beneath the ground. A further advantage obtained by my invention is the fact that the connection is very flexible and that the trailer may be satisfactorily moved in any direction with reference to the tractor without impairing the effectiveness of the driving connection between the tractor and trailer operating means.

I claim:

1. In combination, a tractor, a trailer, operating means on the trailer, controlling means on the tractor, and mechanism connecting the operating means with the controlling means, said mechanism including two inter-fitting members, one functioning to permit vertical movement and the other twisting movement of the trailer with reference to the tractor.

2. In combination, a tractor, a trailer, operating means on the trailer, controlling means on the tractor, a bracket disposed intermediate the tractor and trailer, the bracket being mounted to swing about a vertical pivot on the trailer and to swing about a horizontal pivot with reference to the tractor, one of said pivotal connections being so arranged that the trailer may twist with reference to the tractor, mechanism including a shaft extending through one of said pivots for connecting the operating with the controlling means, and the other of said pivots providing a draw-bar connection between the tractor and trailer.

3. In combination, a tractor, a trailer, a bracket pivotally mounted on the trailer, operating means on the trailer and controlling means on the tractor, mechanism connecting the operating and controlling means including a shaft extending through the bracket two relative removable members providing a draw-bar connection between the trailer and tractor, one of said members being arranged to allow movement of the trailer in a vertical plane with reference to the tractor, and the other of said members being arranged to allow twisting of the trailer with reference to the tractor, and said shaft providing a pivotal connection between the bracket and tractor by means of which the tractor may be turned in a horizontal plane with reference to the tractor.

In testimony whereof, I hereunto affix my signature.

PHILIP RAIMER.